Dec. 3, 1963  A. STAMBERA  3,112,806
WEIGHING ASSEMBLY
Filed May 15, 1962

United States Patent Office 3,112,806
Patented Dec. 3, 1963

3,112,806
WEIGHING ASSEMBLY
Adolf Stambera, Stuttgart-Bad Cannstatt, Germany, assignor to Fr. Hesser Maschinenfabrik-Aktiengesellschaft, Stuttgart-Bad Cannstatt, Germany
Filed May 15, 1962, Ser. No. 194,923
Claims priority, application Germany May 18, 1961
5 Claims. (Cl. 177—59)

The invention relates to a weighing assembly, incorporating a pre-dispensing device and a make-up device, for weighing out and discharging pourable commodities of various kinds.

In particular it relates to an assembly of the general conception set out in U.S. patent application Serial No. 134,958 viz. comprising a pre-dispensing device, a weigher, a make-up device controlled by said weigher and a rotatable carrier with weigh holders spaced therearound and intermittently movable to present the weigh holders successively to the pre-dispensing device, the weigher and the make-up device, and then to discharge them.

It is an object of the present invention to construct a weighing assembly of this character which is particularly advantageous and compact, and at the same time gives a high output.

To this end, the carrier is made in the form of a ring rotatable in a vertical plane with the weigher stationary therein, and the weigh holders adapted to be detached from the ring and set down freely on the weigh pan of the weigher on arrival at the summit of their circular travel and above this weigher.

The apparatus constructed in accordance with this invention has an additional attribute that the weigh holders can be discharged without the assistance of any additional operating means at a lower point of the carrier travel where the mouths of the weigh holders are downwardly directed.

An example of the invention is illustrated in the accompanying diagrammatic drawings and is exposed in more detail below.

Figure 1:
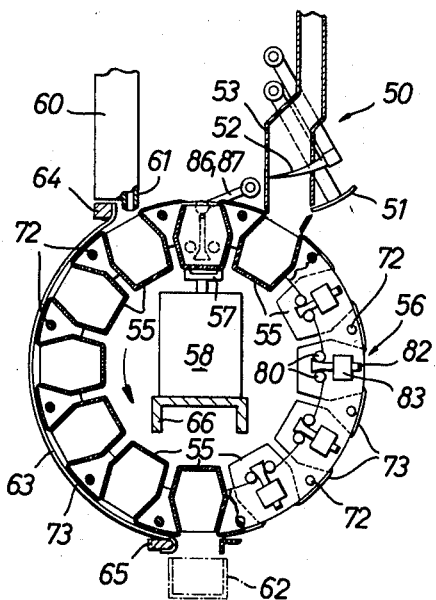
FIGURE 1 is a front view of an embodiment according to the invention partly in section.
Figure 2:
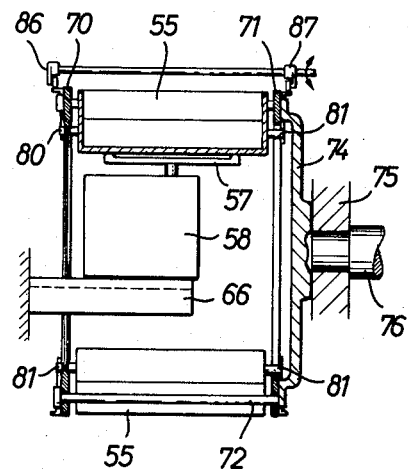
FIGURE 2 is an axial cross section through the embodiment illustrated in FIGURE 1, and FIGURES 3 and 4 are views on a larger scale and taken respectively as a front view and a cross section of the suspension of one of the weigh holders on the conveyor wheel.

The apparatus according to the invention illustrated in the drawing is assumed to be used for weighing out commodities in stick form, for example macaroni. A specified quantity of this commodity is segregated in the chute 53 of a dispenser 50 between a shutter 51 and a separating wedge 52. The segregated quantity is of a weight slightly below the target weight. This quantity is then transferred, by swinging of the shutter 51, into one of the, for example twelve, weigh holders 53 which are freely mounted on a carrier ring 56 which is disposed below the dispenser 50 and is adapted to be intermittently rotated in the vertical plane.

After one step of the carrier ring, in a counter-clockwise direction in FIGURE 1, the filled weigh holder 53 has reached the sumit of its path of travel, and at this location it is set down in fashion on the load pan 57 of a stationary control weigher 58 mounted on a beam 66 secured to the main frame of the apparatus. This weigher 58, which can be of standard form and is not the subject of this invention, is preferably electronically operated, and measures the weight of commodity in the holder 55 (this commodity having previously been measured volumetrically). The weigher 58 feeds the measurement in known fashion, in the form of an appropriate electrical current impulse, to a make-up dispensing device 60. This device 60 may be of any suitable conventional form, for example a screw dispensing device of the kind revealed in U.S. Patent No. 2,643,026.

While the make-up dispenser 60 is sorting out the number of sticks of macaroni or the like required to make up the short weight, the carrier ring 56 moves another step to bring the previously-weighed holder 55 into position beneath the outlet 61 of the make-up device 60.

Meanwhile, of course, succeeding weigh holders are being charged and weighed, and the cycle continues, with each holder advancing step by step until the weigh holder carrying its adjusted and made-up weight, reaches its lowermost position in which the filling and emptying opening thereof is directed downwards, thus allowing for discharge of the material from the holder, for example into a waiting vessel 62 of a packaging machine (not shown).

To ensure that no part of the weighed-out and adjusted quantity can drop out of the weigh vessels 55 during the travel of the carrier ring, an arcuate cover strip 63 is provided in the zone of the assembly so as to cover the openings of the weigh holders 55, this strip being secured to stationary supports 64, 65. If desired, the cover strip could be endless and run around guide rollers so as to travel along with, and at the same intermittent rate, as the weigh holders 55.

To enable the control weigher 58 to be free and independent within the carrier ring 56, this ring is mounted in overhung fashion, i.e. at one side only, thereby enabling the fixed beam 66 to project into the interior of the ring through the other and open side of the latter, whereby it carries the weigher 58 free from vibration.

To allow the weigh holders 55 to be suspended at the periphery of the conveyor ring 56 at uniform intervals, the ring comprises two spaced annular sections 70, 71 which are connected together by rods 72 and cover plates 73. One annulus 71 is fastened to a boss 74 which is intermittently rotated, to impart a like movement to the conveyor ring 56, by a shaft 76 which turns in a bearing portion 75 of the frame of the apparatus.

As stated, the weigh holders 55 are adapted to be set down when completely detached from the carrier ring 56. To this end these holders have dowels, 80 and 81 respectively, at each of their front and rear sides and these bear against the corresponding dovetail-shaped inner ends of carrier elements 82 at the appropriate positions around the ring 56. These carrier elements 82 each have a strip-shaped body slidable radially in relation to the axis of the ring 56 in a corresponding bearing 83 on the latter. The carrier elements 82 are urged outwardly away from the axis of the carrier ring by tension springs 84 which are anchored, on the one hand to the elements 82 and, on the other hand, to the relevant annular sections 70, 71. By this means the dovetail parts of elements 82 press the dowels 80, 81 yieldably against the inner edges of sections 70 and 71, this being sufficient to maintain the weigh holders 55 firmly in radial position.

Figure 4:
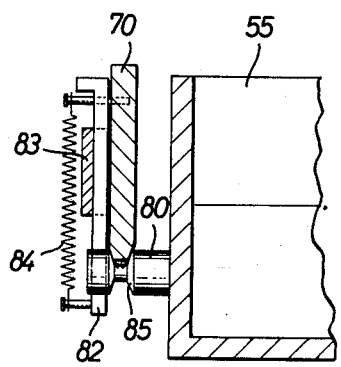
Figure 3:
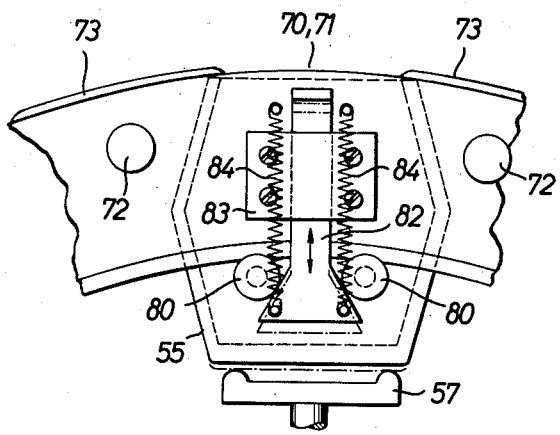

To provide for correct and sure positioning of the weigh holders 55 between the two annular sections 70 and 71, as shown in FIGURE 4 the dowels 80 at the front side of each weigh holder 55 are formed with a bevelled groove 85 which engages with the correspondingly bevelled inner edge of the front annular section 70.

In implementing the free deposition on the weigh pan 57 of the weigher 58 of that weigh holder 55 which is in its top position, rockable lever 86, 87 at this station shifts the associated carrier elements 82 of the appropriate weigh holder 55 radially downwards against the action of the springs 84. The weigh holder 55 concerned drops on to the weigh pan 57 of the weigher 58 and stands completely free on this pan. When the levers 86, 87 pivot back, the springs 84 pull the dowels 80, 81 back against the annular sections 70, 71, so that the weigh holder 55 re-assumes its fixed position on the ring 56.

It is to be pointed out that, instead of using a carrier ring, any other endless carrier device, travelling in a vertical plane, for example a conveyor chain, can be used and the weigh holders thereof will then be filled and weighed, in the fashion described above, along a horizontal run of the chain or the like, and discharged when they reach a part at which the travel is reversed.

I claim:

1. In an assembly for weighing out and discharging measured and corrected quantities of pourable commodities and incorporating a pre-dispensing station served by a pre-dispenser, a weighing station served by a weigher, a weight make-up station served by a make-up device under the control of said weigher, and a discharge station, a conveyor for conducting commodity from station to station comprising a carrier ring rotatable in a vertical plane through said stations, means for intermittently rotating said carrier ring, a plurality of commodity holders detachably mounted on said carrier ring for travel therewith, said holders having open mouths and being mounted on said ring with said mouths facing radially outwards, means supporting said weigher within said ring at a position at which the holders reach the uppermost position thereof, said predispensing station being located behind the weigher relative to the direction of rotation of the ring while said weight make-up station is located ahead of the weigher relative to the direction of rotation of the ring, and means at said weighing station for detaching each of said holders from the carrier ring in turn at this station for resting each said holder on said weigher.

2. A conveyor as claimed in claim 1, comprising a stationary frame, said carrier ring being supported at one side only thereof in said frame, the weigher being supported from said frame on a beam entering through the opposite side of said ring.

3. A conveyor as claimed in claim 1, in which the carrier ring is composed of two spaced and parallel annular sections connected together by rods, and the holders are suspended between these sections.

4. A conveyor as claimed in claim 3, further comprising carrier elements mounted at intervals around the carrier ring and radially slidable in bearings on this ring, abutment means to the centre of the latter, abutment means on said holders engageable by said carrier elements, and spring means urging the carrier elements outwardly to urge the abutment means yieldably against said ring.

5. A conveyor as claimed in claim 4, in which said carrier elements are of dovetail shape and the said abutment means comprises grooved dowels adapted to receive and engage the inner edges of said carrier ring.

References Cited in the file of this patent
UNITED STATES PATENTS

| | | |
|---|---|---|
| Re. 16,405 | Thompson | Aug. 24, 1926 |
| 720,008 | Doble | Feb. 10, 1903 |
| 2,299,586 | Malcher | Oct. 20, 1942 |
| 2,802,658 | Hensgen et al. | Aug. 13, 1957 |
| 2,901,209 | Brady et al. | Aug. 25, 1959 |
| 2,976,006 | Stambera | Mar. 21, 1961 |
| 3,058,536 | Thomson | Oct. 16, 1962 |